United States Patent [19]

Lellouche

[11] Patent Number: 4,885,569
[45] Date of Patent: Dec. 5, 1989

[54] METHOD AND DEVICE FOR TRANSFERRING SIGNALS BETWEEN MODULES OF AN ELECTRONIC UNIT

[76] Inventor: Isaac M. Lellouche, 2 rue Hegesippe Moreau, Paris, France

[21] Appl. No.: 145,763
[22] PCT Filed: Apr. 22, 1987
[86] PCT No.: PCT/FR87/00132
§ 371 Date: Dec. 18, 1987
§ 102(e) Date: Dec. 18, 1987
[87] PCT Pub. No.: WO87/06740
PCT Pub. Date: Nov. 5, 1987

[30] Foreign Application Priority Data

Apr. 22, 1986 [FR] France ............... 86 05759

[51] Int. Cl.[4] .............................. H04M 9/02
[52] U.S. Cl. .......................... 340/826; 340/825.03; 340/825.04; 370/85.1; 379/93
[58] Field of Search ............... 340/825.03, 825.04, 340/826, 825.79; 370/58, 85, 94, 112; 379/93, 269, 386, 284, 94; 364/131

[56] References Cited

U.S. PATENT DOCUMENTS

| | | |
|---|---|---|
| 4,292,475 | 9/1981 | Hill et al. |
| 4,628,437 | 12/1986 | Poshmann et al. ............... 364/131 |
| 4,640,989 | 2/1987 | Riner et al. ............... 379/386 |
| 4,652,873 | 3/1987 | Dolsen et al. ............... 340/825.5 |
| 4,726,054 | 2/1988 | Molnar ............... 379/269 |
| 4,740,956 | 4/1988 | Hailpern et al. ............... 370/85 |
| 4,742,515 | 5/1988 | Dabholkar et al. ............... 370/112 |
| 4,744,078 | 5/1988 | Kowalczyk ............... 370/85 |
| 4,792,941 | 12/1988 | Yanosy, Jr. et al. ............... 370/85 |

FOREIGN PATENT DOCUMENTS 2743765 4/1978 Fed. Rep. of Germany ............... 340/825.22

Primary Examiner—Donald J. Yusko
Assistant Examiner—Brian S. Palladino
Attorney, Agent, or Firm—W. Thad Adams, III

[57] ABSTRACT

A method for simultaneously transferring useful signals between connection points distributed between modules of an electronic assembly. Each signal is transmitted at least substantially continuously between a transmitting connection point and at least one receiving connection point. The method includes the steps of providing a double transfer line common to the assembly of modules, the double transfer line being formed by a group of physical conductors comprising a linking line with at least one linking conductor to which all the modules are connected and a connection line comprising several connection conductors connectible selectively to each of the connection points for transferring useful signals. An identification code is attributed to each connection point and to each connection conductor. Interconnection reconfiguration commands are disseminated by at least one of the modules directly to each of the modules. The identification codes of the linking line indicates at least one connection conductor of the connection line and one or more connection points to be connected thereto or disconnected therefrom. Each module complies with any connection or disconnection order detected in a command which relates to one of its connection points.

11 Claims, 3 Drawing Sheets

METHOD AND DEVICE FOR TRANSFERRING SIGNALS BETWEEN MODULES OF AN ELECTRONIC UNIT

BACKGROUND OF THE INVENTION

1. Field of the Invention

The invention relates to the field of electronic apparatus and concerns electronic units formed of several parts which are connected electrically by means of multiple contact connectors.

When an electric unit is constructed, such for example as an apparatus or a system, it is often necessary for practical reasons to divide it mechanically into several elements often called modules which are connected electrically by means of multiple contact connectors. Thus, for example, apparatus are very often constructed by dividing up their circuits on several flat supports called "cards" which are connected by means of multicontact connectors, or systems are formed by distributing the different functions between several apparatus which are connected together by cables provided with multipin plugs.

2. Description of the Prior Art

It is practically always necessary when an electronic unit is thus divided into modules, to transfer signals therebetween so as to ensure the overall operation. For certain categories of units, the signals to be transferred between modules are in the form of digital messages of given duration and fairly short, and a very suitable means for carrying out this transfer is the technique called "multiplex" in which the messages are emitted one after the other on a common group of conductors called "bus" to which each module is permanently connected.

In many other cases, on the other hand, the multiplex technique is not suitable for transferring signals between modules because, for example, the signals must be transmitted continuously or substantially continuously such generally as audio or video signals and most of the so called analog signals, or because the transmission of a signal cannot tolerate the delay which the multiplex is likely to introduce when the bus is occupied by a transmission in progress. A distinct connection must then be established for each signal and these connections are formed by appropriate wiring, specific to the apparatus or the system, formed, depending on the case, between the bases (i.e. the fixed parts) of the connectors serving for connecting the modules, or by means of cables connecting the modules together.

In practice the need for such wiring, often called "basket weave wiring" for the apparatus, is a source of drawbacks. During the design it is often complicated to define. It is then costly to provide because it is specific to the apparatus or system and, during adjustment, it risks having to be modified. It must be modified if, in order to adapt to new conditions of use for example, it proves necessary to modify the interconnections between modules and it does not allow, contrary to the multiplex, connections to be adapted during use to the requirements of the moment, for example, when a receiving circuit receives successively signals coming from different modules. It requires a definite base for plugging in each module, which in practice leads to providing the plugs with so called "foolproof" devices so as to prevent connecting errors and, in the case of a system formed of many apparatus, these apparatus must be connected together by numerous cables, which are expensive, cumbersome and difficult to identify when the installation must be modified.

SUMMARY OF THE INVENTION

The purpose of the invention is to overcome these drawbacks. The first object of the invention is a method for simultaneously transferring signals, particularly analog signals between connection points or ports distributed between modules of an electronic assembly, each signal being transmitted substantially continuously between a transmitting port and at least one receiving port. This method is characterized in that it consists:

in forming a permanent double transfer line common to the assembly of the modules, formed by a group of physical conductors and comprising, on the one hand, a connection line with at least one connecting conductor to which all the modules are permanently connected, and used for the dissemination of digital messages between modules and, on the other hand, a connection line connectable selectively to each of the connection points or ports;

in attributing to each port and to each connecting conductor a digital identification code; and in causing interconnection reconfiguration commands to be disseminated directly by at least one of the modules to the whole of the modules and by means of the connection line, indicating, by means of said digital identification codes, at least one connecting conductor and one or more ports to be connected thereto or disconnected therefrom, every module complying with any connection or disconnection order detected in a command and which relates to one of its ports, following which the transfer of signals takes place between the ports connected by the new interconnection reconfiguration thus formed.

According to another characteristic of the invention, each module stores the state of each connecting conductor.

According to another characteristic of the invention, interconnection reconfiguration commands are release commands indicating a connecting conductor every port of which connected thereto must be disconnected therefrom.

Another object of the invention, is an electronic apparatus for implementing the above method, which apparatus is formed of modules connected by multiple contact connectors. It is characterized in that:

corresponding contacts of the bases of the multiple contact connectors connecting the modules are connected together by line conductors at least one of which called linking conductor, forms a linking line and the others called connection conductors form a connection line, each module includes, in addition to the plug of the multiple contact connector and the module properly speaking, a transfer device comprising a microprocessor connected to each contact of the plug corresponding to a linking conductor and a connection matrix to which the microprocessor transmits control signals, the matrix is connected to the contacts of the plug corresponding to the connection conductors and has at least one port connected to the module properly speaking, for each port, the connection matrix includes a selector circuit controlled from control signals transmitted by the microprocessor, which allows the connection point to be connected to one of the connection conductors via the corresponding contact of the plug of the module, microprocessors transmit over the linking line digital messages disseminating to all the microprocessors interconnection reconfiguration commands, which commands are received and analyzed by each microprocessor and any microprocessor which detects, by analysing a command, a connection or disconnection order relative to a port of the connection matrix of its module, transmits to this matrix the appropriate control signal so that this order is executed.

According to another characteristic of the invention, the selector circuits of the connection matrices are equipped with a set of electronic switches comprising for each connection conductor a switch for selectively connecting the conductor to the port.

According to yet another characteristic of the invention, the transfer device of the modules includes an interconnection state memory into which the microprocessor of the module may write or from which it may read and this memory contains registers indicating the state of each connection conductor.

According to yet another characteristic of the invention, said interconnection state memory is designed so that its contents are preserved in the case of an electric power supply cut.

According to yet another characteristic of the invention, the commands emitted by a microprocessor are caused by orders received in the form of digital signals at an order input.

According to yet another characteristic of the invention, said orders causing the commands may be transfer requests and end of transfer notifications.

BRIEF DESCRIPTION OF THE DRAWINGS

The invention will be described in detail in one embodiment with reference to the accompanying drawings in which.

DESCRIPTION OF THE PREFERRED EMBODIMENT

Figure 1:
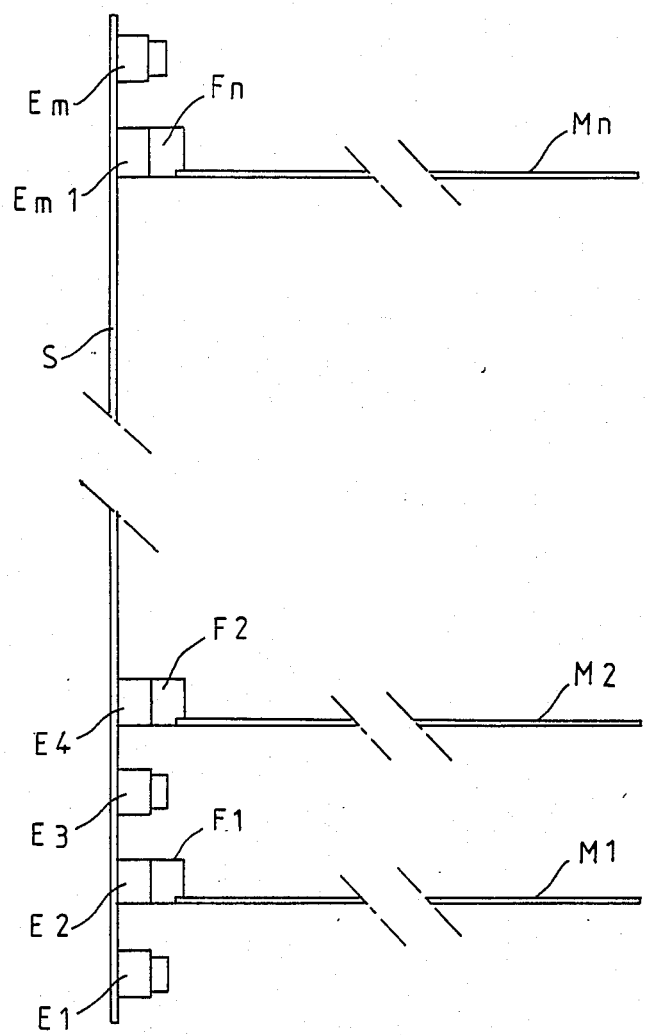
FIG. 1 shows an electronic apparatus formed of modules which may be connected together by means of connectors.

In FIG. 1 are shown, seen in profile, modules M1, M2, ... Mn of an electronic apparatus, which are for example cards each provided with a connecting plug: F1, F2, ... Fn. These plugs are identical, more particularly they do not have a foolproof device, so that each module can be plugged into any one of the connector bases E1,E2, ... $E^m$, fixed to a common support S. This standardization of the positions has been illustrated by showing in FIG. 1 module M1 plugged into base E2, module M2 into base E4, module Mn into base $E^m-1$.

Figure 2:
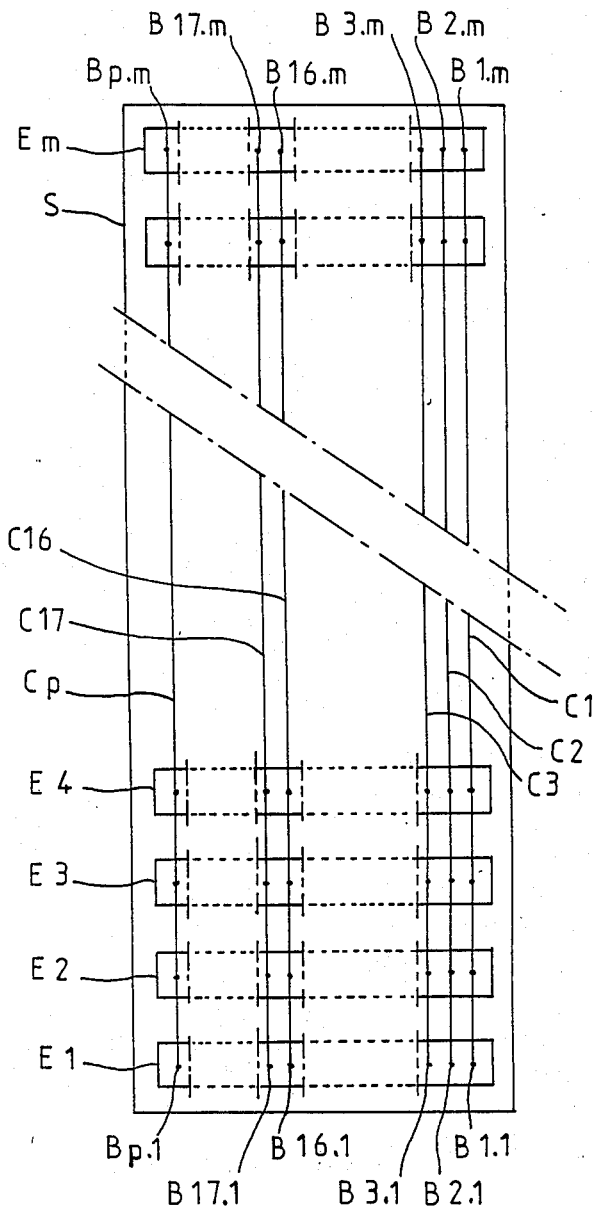
FIG. 2 shows the wiring formed on the connector bases.

FIG. 2 shows, in a top view, the wiring between the bases of the connectors. To identify a contact on the base or on the plug of a connector the letter B has been used followed by a number indicating the position on the connector. As the figure shows the "corresponding" contacts, i.e. having the same relative position on the connector, in other words bearing the same index, are connected together by a so called "line conductor", C1, C2, ... CP by respectively the contacts B1, B2, ... BP of each connector. It will be noted that, in this way, a module is able to operate at any position since its electric connection remains the same whatever the base used for plugging it in.

To put the method properly speaking into practice, sixteen line conductors: C1, C2, ... C16 are for example used which form what will be called the double transfer line. The other conductors C17 to Cp remain available for any other use than the transfer of signals between modules, and may serve particularly for supplying the modules with electric power and distributing common signals such as a clock signal for example.

The double transfer line includes, on the one hand, one or more linking conductors forming the linking line and, on the other hand, connection conductors forming the connection line. In the example, linking line only has one line conductor, C1, the connection line being formed of 15 other conductors of the double transfer line (C2, C3, ... C16).

Reference will now be made to the block diagram of a module M show in FIG. 3. The module includes a connecting plug F which makes it possible as has been mentioned to plug it into any one of the bases E, a transfer device 1 and naturally the "module properly speaking" i.e. the assembly of circuits and components which ensure its proper function, whose characteristics and construction do not concern the invention and which is shown as a whole in the FIG. by the contour 2.

The transfer device 1 includes a microprocessor 10, a connection matrix 11 and an interconnection state memory 12.

For all the modules, the connector F and the transfer device 1 are, if not identical, at least similar, only the functions provided by the elements grouped in the contour 2 changing from one module to another.

The microprocessor 10 has a series type input-output 100 which is connected to contact B1 of plug F and is thus connected to the linking conductor C1 when the module is connected to a base. It further has a parallel type output channel 101 which transmits digital control signals to the connection matrix 11 and it is coupled to memory 12 over a multiplexed bilateral link 102 allowing, as is known, writing into this memory or reading out therefrom. It may further have an order signal input 103, preferably of parallel type, connected to a plug 104 accessible from outside the apparatus.

The connection matrix 11 is, on the one hand, connected to 15 contacts B2, ... B16 of the plug and is thus connected to the 15 connection conductors when the module is plugged into a base. It has, on the other hand, a certain number of ports, three by way of example in the FIG.: 111, 112, 113 which are connected to the module properly speaking 2; as shown at 111', 112'; 113' (FIG. 3).

It should be noted that the "module properly speaking 2" could in fact be formed of several separate apparatus, each connected by an individual cable.

For each of these ports the matrix has a selector circuit (114, 115, 116 for respectively the points 111, 112, 113) equipped with a set of 15 electronic switches, each switch making it possible to connect one of the contacts B2, ... B16 of the plug. These switches are controlled from control signals delivered by the microprocessor at its output 101 so that they are all open and then the port is free, or so that there is one, and only one closed and then one of the connection conductors is selectively connected to the port.

Depending on the use which is made of it in the module properly speaking, a port is transmitting if it is fed by a signal source of the module or, on the contrary, receiving when it is intended to transmit to the module a signal received via the selector circuit. It will be understood that the assembly of transfer devices of the apparatus makes possible the transfer of signals between modules since, for a signal transmitted from a transmitting port to be transferred to a receiving port or to several of these ports, it is sufficient for all these ports to have been connected, through the control signals of the microprocessors and via their selector circuit., to the same connection conductor.

It may happen that a connection thus formed then becomes useless because the transfer for which it served is finished. It is then possible, so that it may be attributed to another transfer, to release the connection conductor which had been assigned thereto by disconnecting the ports. The number of interconnection conductors, equal to 15 in the example, may thus be limited to the maximum number of interconnections to be formed simultaneously, without being able to be deferred.

It is necessary to coordinate the controls of the microprocessors with respect to the selector circuits so that a connection is correctly formed between ports via a given connection conductor or so that the release of a connection conductor takes place. To this end, the microprocessors exchange digitally coded messages between themselves via the linking line. Preferably, these messages are transmitted in series mode so that only one linking conductor (C1) is required.

The procedure proposed for coordinating the controls is that any modification of the interconnection configuration is caused by a message whose coded contents signify an interconnection reconfiguration command transmitted by a microprocessor and disseminated to the whole of the microprocessors 10.

To designate, in these cases, the conductors and the ports, an identification code is attributed to each one: for example, the connection conductors are simply numbered like the connector contacts which they connect together; preferably, the code for identifying the ports makes it possible to recognize the function and the characteristics of their module, the particular function of the port in the module, and it is completed by an index if it is necessary to distinguish between several modules having the same characteristics in the same assembly.

An interconnection reconfiguration command generally indicates ports to be connected to a connection conductor or disconnected from such a conductor.

Connection or disconnection commands may for example be used as also conductor release commands.

Generally, a connection or disconnection command specifies a connection conductor and ports which are to be connected thereto or disconnected therefrom, but multiple commands may of course be provided for specifying in a single message connections or disconnections relating to several connection conductors, more particularly for forming twin wire connections.

However, a connection command cannot include the explicit specification of a connection conductor, this latter being then determined by each microprocessor among the free conductors by a precise selection criterion, for example that having the smallest identification code.

A conductor release command specifies a connection conductor which any port connected thereto must release.

The reconfiguration commands are analysed by each microprocessor and any microprocessor which recognizes by such analysis the order to connect or disconnect a port of its module, transmits to the selector circuit of this port the appropriate control signal so that the order is executed.

Figure 3:
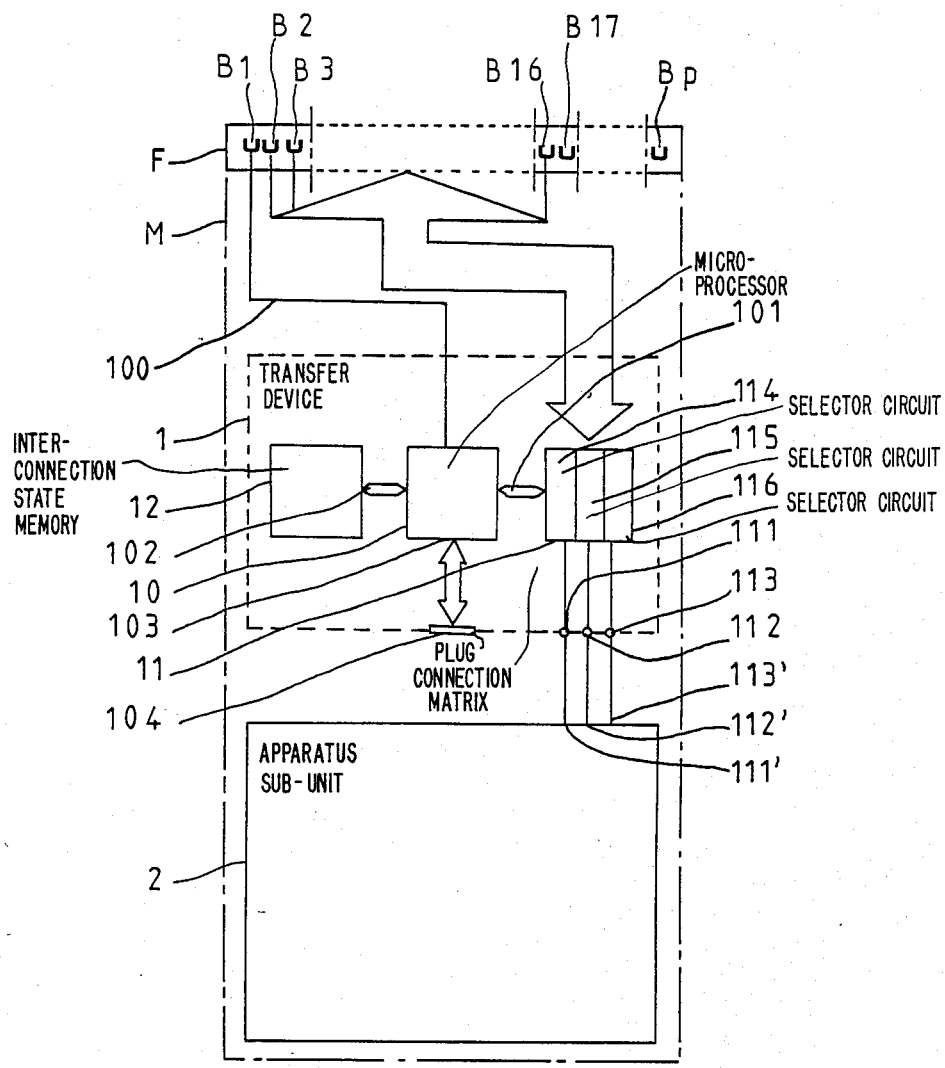
FIG. 3 is a block diagram of a module.

The transmission of a reconfiguration command by a microprocessor is generally caused by an order which it receives in the form of digital signals at an order signal input (103 in FIG. 3). Such an order for example may be a transfer request, an end of transfer notification, a connection request or a disconnection request.

A transfer request, if it is single, specifies a transmitting connection point and a receiving connection point at least, between which it is necessary to transfer a signal. The microprocessor receiving the request provides an appropriate connection command, if necessary by choosing for the transfer a connection conductor from those which are free (the one for example having the smallest identification code).

Of course, if several requests produced by different microprocessors are transmitted simultaneously, hierarchization of these requests may be provided, and they may be satisfied in the order of this hierarchy, using a known arbitration process.

An end of transfer notification specifies one of the ports involved in the transfer in question. The microprocessor receiving it determines the connection conductor attributed to the transfer and provides the command for freeing the appropriate connection conductor.

Of course, the microprocessors may be programmed so that they admit multiple requests or notifications, relating to several connection conductors.

A connection request relates to a transfer interconnection already formed by a subsequent transfer request, indirectly designated by transmitting the identification code of one of the ports involved, and it specifies at least one port which is to be connected thereto. The microprocessor receiving it determines the connection conductor and provides the appropriate connection command for connecting thereto the specified port or ports.

A disconnection request relates to a connection conductor having been assigned to a transfer, indirectly designated by a port which is connected thereto. The microprocessor receiving it determines the connection conductor and provides the corresponding disconnection command.

In order to be able to provide the reconfiguration commands corresponding to the orders received, particularly for choosing a free connection conductor for a transfer request or for determining the connection conductor indirectly designated by a connection point connected thereto, a possible solution is for any microprocessor capable of receiving orders to use an interconnection state memory (12 in FIG. 3) which it updates at each command transmitted over the linking line. This memory makes it possible to know the state of each connection conductor, i.e. whether the conductor is free or what are the ports which are connected thereto by means for example of a register for each conductor.

It may be useful for the interconnection state of the apparatus, i.e. all the connections of the port, to be able to be reestablished automatically without it being necessary to transmit new orders on the return of the electric power supplies for the modules if these supplies have been interrupted (deliberately or accidentally). This is possible by equipping each transfer device with an interconnection state memory designed so that its contents are automatically preserved in the case of a power supply cut, for example using a battery driven safeguard memory. When the power supply is reestablished, each microprocessor then analyses the contents of this memory and reestablishes by appropriate control signals the state of the selector circuit of its module.

In FIG. 3 it has been shown that the order signals received by the microprocessor at its order signal input (103) may come from a signal source external to the module, but they may also, in certain applications, be elaborated by the module properly speaking, for example by means of manual controls placed on the module.

Furthermore, the microprocessors may respond to the orders received, either by an acquittal message, or by an appropriate rejection message if the order has not been able to be executed (for example for lack of a free connection conductor). Instead of a single input, channel 104 will then be an input/output.

Of course, the microprocessor shown by element 10 in FIG. 3 is not necessarily a single component but it is formed, among other means, from several integrated circuits, for example a microprocessor properly speaking coupled to input/output controls. Conversely, memory 12 may be integrated in the microprocessor.

A microprocessor may more particularly be used of the type 8051 commercialized by the firm INTEL.

It will be noted that the example described refers to signal transfers to be made between modules of an apparatus but that the invention may also be applied for transferring signals between apparatus forming the different modules of an electronic unit. In this case, instead of wiring connecting the base contacts of the connectors directly together, the double transfer line may advantageously be in the form of a flat multiconductor cable to which the multipole contact plugs connecting the modules are connected by means, for example, of pins piercing the insulation and coming into contact with the conductors.

Generally, the device of the invention applies particularly to any electronic apparatus formed of modules between which signals and, in particular, audio or video signals are to be transferred.

What is claimed is:

1. A method for simultaneously transferring useful signals between connection points distributed between modules of an electronic assembly, each signal being transmitted at least substantially continuously between a transmitting connection point and at least one receiving connection point, which method comprises:
   (a) providing a double transfer line common to the assembly of modules, said double transfer line being formed by a group of physical conductors and comprising:
      (i) a linking line with at least one linking conductor to which all the modules are connected to be capable of continuous dissemination of digital messages between modules; and
      (ii) a connection line comprising several connection conductors connectable selectively to each of the connection points for transferring said useful signals;
   (b) attributing to each connection point and to each connection conductor an identification code; and
   (c) disseminating interconnection reconfiguration commands by at least one of the modules directly to each of the modules and by means of the linking line, indicating, by means of said identification codes, at least one connection conductor of said connection line and one or more connection points to be connected thereto or disconnected therefrom, every module complying with any connection or disconnection order detected in a command and which relates to one of its connection points, following which the transfer of signals takes place between the connection points connected by the new interconnection reconfiguration thus formed.

2. The method as claimed in claim 1, wherein said connection conductor is designated indirectly by designating a connection point which is connected thereto.

3. The method as claimed in claim 1, wherein modules store the free or occupied state of each said connection conductor.

4. The method as claimed in claim 3, wherein the storage of the free or occupied connection state of said first connection conductor is updated at each command transmitted over said first connecting conductor.

5. The method as claimed in claim 1, wherein said reconfiguration commands comprise release commands indicating a said connection conductor from which any connection point connected 6. An electronic apparatus for the simultaneous transfer of signals between connection points distributed between modules of an electronic unit, each signal being transferred at least substantially continuously between a transmitting connection point and at least one receiving connection point, wherein:
   (a) a plurality of corresponding contacts of bases of multiple contact connectors connecting the modules are connected together by a double transfer line comprising a connection line and a linking line, said connection line comprising a plurality of connection conductors and said linking line comprising at least one linking conductor;
   (b) each module includes a transfer device comprising a microprocessor connected to each contact of a plug corresponding to a linking conductor and a connection matrix to which the microprocessor transmits control signals;
   (c) the connection matrix is connected to each contact of the plug corresponding to the connection conductors and has at least one connection point connected to an apparatus subunit of the electronic apparatus;
   (d) for each connection point, the connection matrix includes a selector circuit controlled from control signals transmitted by each module microprocessor, which allows the connection point to be connected to one of the connection conductors via the corresponding contact of the plug of the respective module; and
   (e) the microprocessor of each module transmits interconnection reconfiguration commands over the respective linking line messages to all other microprocessors, which commands are received and analyzed by each microprocessor and any microprocessor which detects, by an analyzing a command, a connection or disconnection order relative to a connection point of the connection matrix of its module, transmits to this matrix the appropriate control signal so that this order is executed.

7. The electronic apparatus as claimed in claim 6, wherein the transfer device of each of the modules includes an interconnection state memory into which the microprocessor of the module may write or which it may read and this memory contains registers indicating the state of each connection conductor.

8. The electronic apparatus as claimed in claim 7, wherein said interconnection state memory includes means for preserving its contents in the case of an electric power supply interruption.

9. The electronic apparatus as claimed in claim 6, wherein the commands emitted by a microprocessor are caused by orders received in the form of digital signals at an order input.

10. The electronic apparatus as claimed in claim 9, wherein the orders causing the commands may be "transfer" requests and "end of transfer" notifications.

11. The electronic apparatus as claimed in claim 9, wherein the orders causing the commands are "connection" orders and/or "disconnection" requests.

* * * * *